United States Patent
Kim et al.

(10) Patent No.: US 7,119,947 B2
(45) Date of Patent: Oct. 10, 2006

(54) DUAL-PORT BROADBAND LIGHT SOURCE

(75) Inventors: Sang-Ho Kim, Suwon-si (KR); Seong-Taek Hwang, Pyeongtaek-si (KR); Yun-Je Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 10/869,428

(22) Filed: Jun. 16, 2004

(65) Prior Publication Data

US 2005/0122573 A1 Jun. 9, 2005

(30) Foreign Application Priority Data

Dec. 4, 2003 (KR) .................. 10-2003-0087726

(51) Int. Cl.
*H10S 4/00* (2006.01)
(52) U.S. Cl. .................................... 359/341.1; 359/333
(58) Field of Classification Search ................ 359/333, 359/341.1
See application file for complete search history.

(56) References Cited

U.S. PATENT DOCUMENTS

| | | | | |
|---|---|---|---|---|
| 5,557,442 A | * | 9/1996 | Huber ........................ 359/333 |
| 5,731,892 A | * | 3/1998 | DiGiovanni et al. ..... 359/337.4 |
| 5,822,113 A | * | 10/1998 | Delavaux et al. ........ 359/341.3 |
| 5,894,488 A | * | 4/1999 | Gaiffe et al. .................... 372/6 |
| 6,195,200 B1 | * | 2/2001 | DeMarco et al. ....... 359/337.21 |
| 6,456,428 B1 | * | 9/2002 | Nakaji et al. .......... 359/341.41 |
| 6,717,718 B1 | * | 4/2004 | Kelsoe et al. ................ 359/333 |
| 6,788,712 B1 | * | 9/2004 | Atieh ............................. 372/6 |
| 6,928,243 B1 | * | 8/2005 | Youn et al. ..................... 398/33 |
| 2002/0008900 A1 | * | 1/2002 | Sugaya et al. ............ 359/341.1 |
| 2002/0008901 A1 | * | 1/2002 | Kinoshita ................. 359/341.1 |
| 2002/0118446 A1 | * | 8/2002 | Lee et al. ................. 359/341.2 |
| 2002/0167722 A1 | * | 11/2002 | Willner et al. .............. 359/349 |
| 2002/0181090 A1 | * | 12/2002 | Song et al. .................. 359/349 |
| 2002/0181091 A1 | * | 12/2002 | Song et al. .................. 359/349 |
| 2004/0233516 A1 | * | 11/2004 | Hwang et al. .............. 359/349 |
| 2005/0111078 A1 | * | 5/2005 | Qiao et al. .................. 359/337 |
| 2005/0206998 A1 | * | 9/2005 | Ito .............................. 359/333 |
| 2006/0082867 A1 | * | 4/2006 | Starodoumov et al. ..... 359/337 |

* cited by examiner

*Primary Examiner*—Jack Keith
*Assistant Examiner*—Ari Diacou
(74) *Attorney, Agent, or Firm*—Cha & Reiter, LLC

(57) ABSTRACT

A dual-port broadband light source is disclosed. In the dual-port broadband light source, a first beam splitter splits a first ASE at a first ratio into the second and third light paths and outputs the first ASE received from the second light path to the first light path. A second beam splitter splits a second ASE at a second ratio into the second and fourth light sources and outputs the second ASE received from the second light path to the first light path. A first reflector reflects input first and second ASEs in the first light path, and a second reflector reflects input first and second ASEs in the second light path. A first gain medium generates the first ASE between the first reflector and the first beam splitter, and a second gain medium generates the second ASE between the first reflector and the second beam splitter.

23 Claims, 4 Drawing Sheets

DUAL-PORT BROADBAND LIGHT SOURCE

CLAIM OF PRIORITY

This application claims priority, pursuant to 35 U.S.C. § 119, to that patent application entitled "Dual-Port Broadband Light Source" filed in the Korean Intellectual Property Office on Dec. 4, 2003 and assigned Serial No. 2003-87726, the contents of which are incorporated herein by reference.

BACKGROUND OF THE INVENTION

1. Field of the Invention

The present invention relates generally to an optical module, and more particularly, to a dual-port broadband light source.

2. Description of the Related Art

A light source in a broad wavelength band is needed to measure the optical properties of optical devices in the field of optical communications. Especially in the case when an Erbium-Doped Fiber Amplifier (EDFA) is used in an optical communication system, optical signals may range from 1520 nm to 1620 nm. Thus, a light source is needed that can measure the optical properties of optical devices in the desired wavelength band. A broadband light source used in conjunction with a wavelength locked LD (Laser Diode) is attracting interest as a light source for simultaneously accommodating multiple users in a WDM-PON (Wavelength Division Multiplexing-Passive Optical Network) as a future ultra high-speed optical subscriber network. Existing broadband light sources use ASE (Amplified Spontaneous Emission) light from a white light source or an EDFA. The white light source has limitations in serving as a WDM-PON light source requiring high power or in measuring optical device properties because its output power is weak. The use of an EDFA as a light source, on the other hand, is not cost-effective.

U.S. Pat. No. 6,507,429 entitled "Article Comprising a High Power/Broad Spectrum Superfluorescent Fiber Radiation Source" discloses a broadband light source for emitting a C-band (1520 to 1570 nm) and L-band (1570 to 1620 nm) ASE light. The broadband light source includes first and second rare earth-doped optical fibers and an isolator interposed between them. A first pumping light from a first pump light source is provided to the first rare earth-doped optical fiber and a second pumping light from a second pump light source is provided to the second rare earth-doped optical fiber. A reflector reflects the ASE light emitted from the first rare earth-doped optical fiber back to the first rare earth-doped optical fiber, thereby helping the first rare earth-doped optical fiber generate an L-band ASE light. The second rare earth-doped optical fiber operates to amplify the L-band ASE light and generate a C-band ASE light. Consequently, the broadband light source can output a C-band and an L-band ASE light through its output port.

However, in the typical broadband light source described, the C-band ASE light emitted backward from the second rare earth-doped optical fiber is not utilized because of the isolator between the first and second rare earth-doped optical fibers. Therefore, the broadband light source has low output efficiency. In addition, when the output of the first pump light source is changed to control the L-band ASE light power, the C-band ASE power is also changed. Similarly, if the output of the second pump light source is changed to control the C-band ASE power from the first rare earth-doped optical fiber, the L-band ASE power is also changed. Thus, because the power of the C-band ASE light is closely related to the power of the L-band ASE light, it is not easy to control the output of the broadband light source.

SUMMARY OF THE INVENTION

One aspect of the present invention is to provide a broadband light source with high output power and high output efficiency that is suitable for measuring the properties of an optical device for optical communications or suitable as a WDM-PON broadband light source.

Another aspect of the present invention is to provide a dual-port broadband light source that allows for independent output control.

The above aspects are achieved by providing a dual-port broadband light source. In the dual-port broadband light source, a first beam splitter, connecting a first light path to second and third light paths, and splits a first ASE at a first ratio, outputs the split first ASEs to the second and third light sources, and outputs the first ASE received from the second light path to the first light path. A second beam splitter, connecting the first light path to the second light path and a fourth light path, splits a second ASE at a second ratio, outputs the split second ASEs to the second and fourth light sources, and outputs the second ASE light received from the second light path to the first light path. A first reflector reflects input first and second ASE light in the first light path, and a second reflector reflects input first and second ASE light in the second light path. A first gain medium generates the first ASE between the first reflector and the first beam splitter in the first light path, and a second gain medium generates the second ASE between the first reflector and the second beam splitter in the first light path.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Embodiments of the present invention will be described herein below with reference to the accompanying drawings. For purpose of clarity well-known functions or constructions are not described in detail as they would obscure the invention in unnecessary detail.

Figure 1:
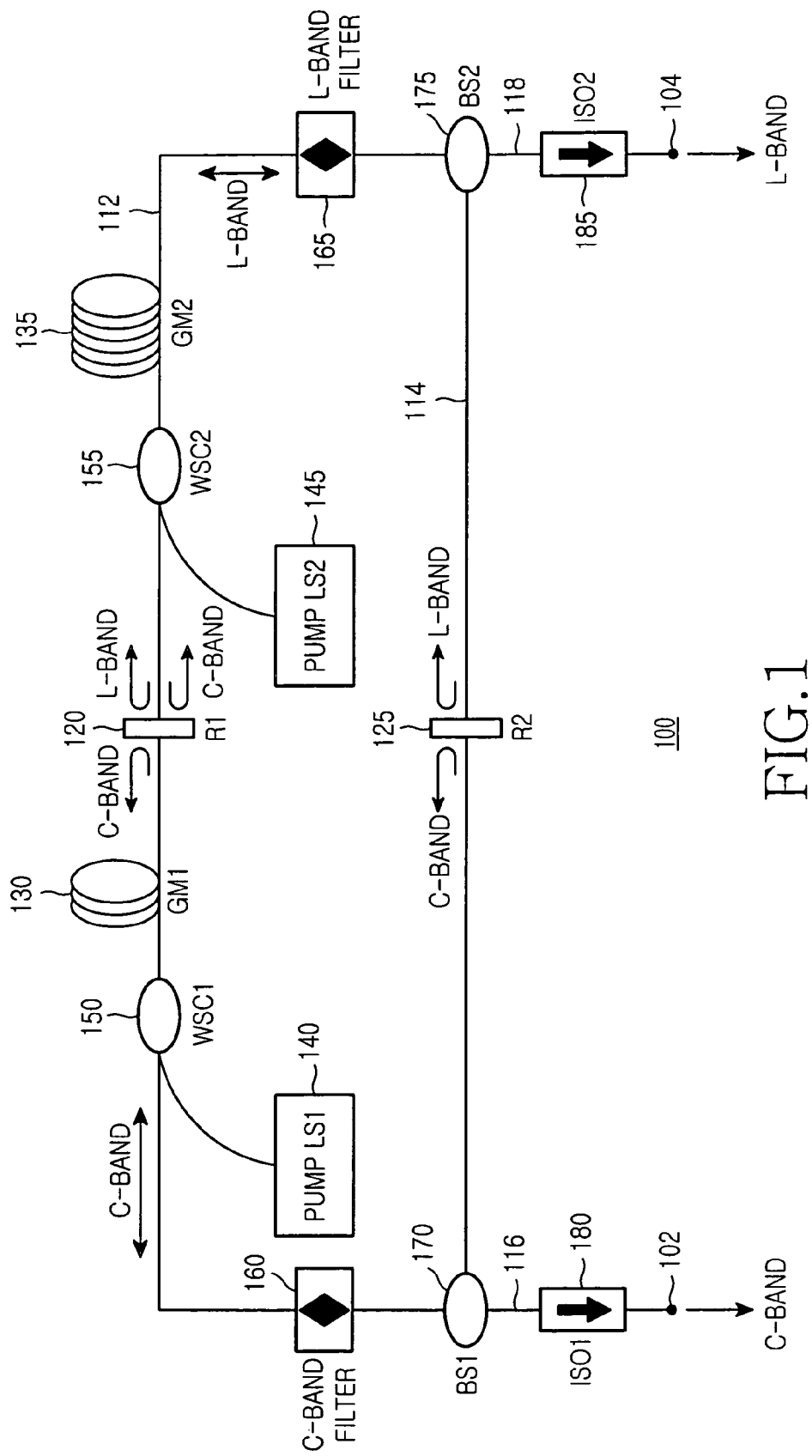
FIG. 1 illustrates the configuration of a dual-port broadband light source according to an embodiment of the present invention.

FIG. 1 illustrates the configuration of a dual-port broadband light source according to an embodiment of the present invention. As shown, a broadband light source 100 comprises first to fourth light paths 112, 114, 116 and 118, first and second gain media 130 and 135 (GM1 and GM2), first and second wavelength selective couplers 150 and 155 (WSC1 and WSC2), first and second pump light sources 140 and 145 (pump LS1 and pump LS2), first and second reflectors 120 and 125 (R1 and R2), a C-band filter 160, an L-band filter 165, first and second beam splitters 170 and 175 (BS1 and BS2), and first and second isolators 180 and 185 (ISO1 and ISO2).

The first pump light source 140 emits a first pumping light at a known wavelength. As would be recognized in the art, the first and second pump light sources 140 and 145 each may include a laser diode (LD) suitable for emitting light at 980 or 1480 nm. The first WSC 150 is installed in the first light path 112 and provides the light from the first pumping source to the first gain medium 130. The first gain medium 130 is installed in the first light path 112. First gain medium 130, pumped by the first pumping light, emits a C-band ASE through both ends and further amplifies an input C-band ASE. The first and second gain media 130 and 135 each may include an optical fiber doped with a rare earth element such as Erbium, or a rare earth-doped planar waveguide circuit. When an EDF (Erbium-Doped Fiber) is used as the first gain medium 130, its length is controlled such that the C-band ASE light can be generated.

The second pump light source 145 emits a second pumping light at a known wavelength. The second WSC 155 is installed in the first light path 112, and provides the light of second pumping source to the second gain medium 135. The second gain medium 135 is installed in the first light path 112. The second gain medium 135, pumped by the second pumping light, emits a C-band ASE and an L-band ASE light. Second gain medium 135 outputs the L-band ASE light through both ends. The second gain medium 135 is further operable to amplify an input L-band ASE. In one aspect, when an EDFA is used as the second gain medium 135, its length is controlled such that the L-band ASE can be generated.

The first reflector 120 is positioned between the first and second gain media 130 and 135 in the first light path 112. First reflector 120 reflects the C-band ASE light output from the first gain medium 130 back to first gain medium 130, which is then amplified in the first gain medium 130 and the L-band ASE light reflected by the first reflector 120 is reflected back to and then amplified in the second gain medium 135. On the other hand, the C-band ASE light output from second gain medium 135 and reflected by the first reflector 120 is absorbed in the second gain medium 135. This reflected C-band light functions as an auxiliary pumping light for pumping the second gain medium 135 in conjunction with the second pumping light provided by second pump source 145. Thus, the amplification efficiency of the second gain medium 135 is increased. Although the first and second reflectors 120 and 125 each reflect C-band and L-band light, the reflection wavelength band is not limited to the C-band and L-band light. According to their usages, the reflection wavelength range can be set to 900 to 1700 nm.

The C-band filter 160 is positioned between first WSC 150 and first beam splitter 170 in first light path 112. The C-band filter 160 restricts the wavelength band of an input C-band ASE to a predetermined or known first wavelength band within the C-band (filtering), thereby concentrating energy in the first wavelength band and thus achieving high output power.

L-band filter 165 is disposed between the second gain medium 135 and the second beam splitter 175 in the first light path 112. The L-band filter 165 restricts the wavelength band of an input L-band ASE light to a predetermined or known second wavelength band within the L-band (filtering), thereby concentrating energy in the second wavelength band and thus achieving high output power.

First beam splitter 170 connects the first light path 112 to the second and third light paths 114 and 116. The first beam splitter 170 splits the filtered C-band ASE light into a first and a second filtered C-band ASE light at a predetermined first ratio and outputs the second filtered C-band ASE light to the second light path 114 and the first filtered C-band ASE light to the third light path 116. The first beam splitter 170 outputs the second filtered C-band ASE light reflected by reflector 125 in second light path 114 to the first light path 112. The second filtered C-band ASE light is further provided to first gain medium 130 through the C-band filter 160 and the first WSC 150.

First isolator 180 is positioned in the third light path 116. It passes the input first filtered C-band ASE and blocks a backward or a reflected light. The first filtered C-band ASE is output outside through a first output port 102 of the broadband light source 100.

Second beam splitter 175 connects the first light path 112 to the second and fourth light paths 114 and 118. The second beam splitter 175 splits the filtered L-band ASE light into a first and a second filtered L-band ASE light at a predetermined second ratio and outputs the second filtered L-band ASE light to the second light path 114 and the first filtered L-band ASE light to the fourth light path 118. The second beam splitter 175 outputs the second filtered L-band ASE, reflected from reflector 125 in second light path 114, to the first light path 112. The second split L-band ASE light is provided to second gain medium 135 through the L-band filter 165.

Second isolator 185 is positioned in the fourth light path 118. It passes the input first split L-band ASE and blocks a backward or reflected light. The first L-band split ASE light is output through a second output port 104 of the broadband light source 100.

The insertion of the first reflector 120 between the first and second gain media 130 and 135 leads to independent control of the intensity of the ASE light emitted from each of the gain media 130 and 135. Thus, the broadband light source 100 can be used as if it were two independent broadband light sources. By this independent control of the ASE light, a change in an external environment such as temperature or life expiration of the first or second gain medium 130 or 135 can be accommodated.

In one aspect, using a TDF (Thulium-Doped Fiber) as a gain medium, an ASE light range of 1450 to 1510 nm can be achieved. In another aspect, using a PDF (Praseodymium-Doped Fiber) as a gain medium, an ASE light range of 1270 to 1330 nm can be achieved. Thus, in accordance with the principles of the invention, an ASE light in a desired wavelength band can be achieved by appropriate use of a gain medium having a large gain spectrum in the wavelength band and a pump light source that can excite the gain medium. Furthermore, other well-known gain mediums are available for used in broadband light source 100, and, hence, the broadband light source 100 disclosed herein can be expanded to other known wavelength ranges, without being limited to any particular wavelength band.

Figure 2:
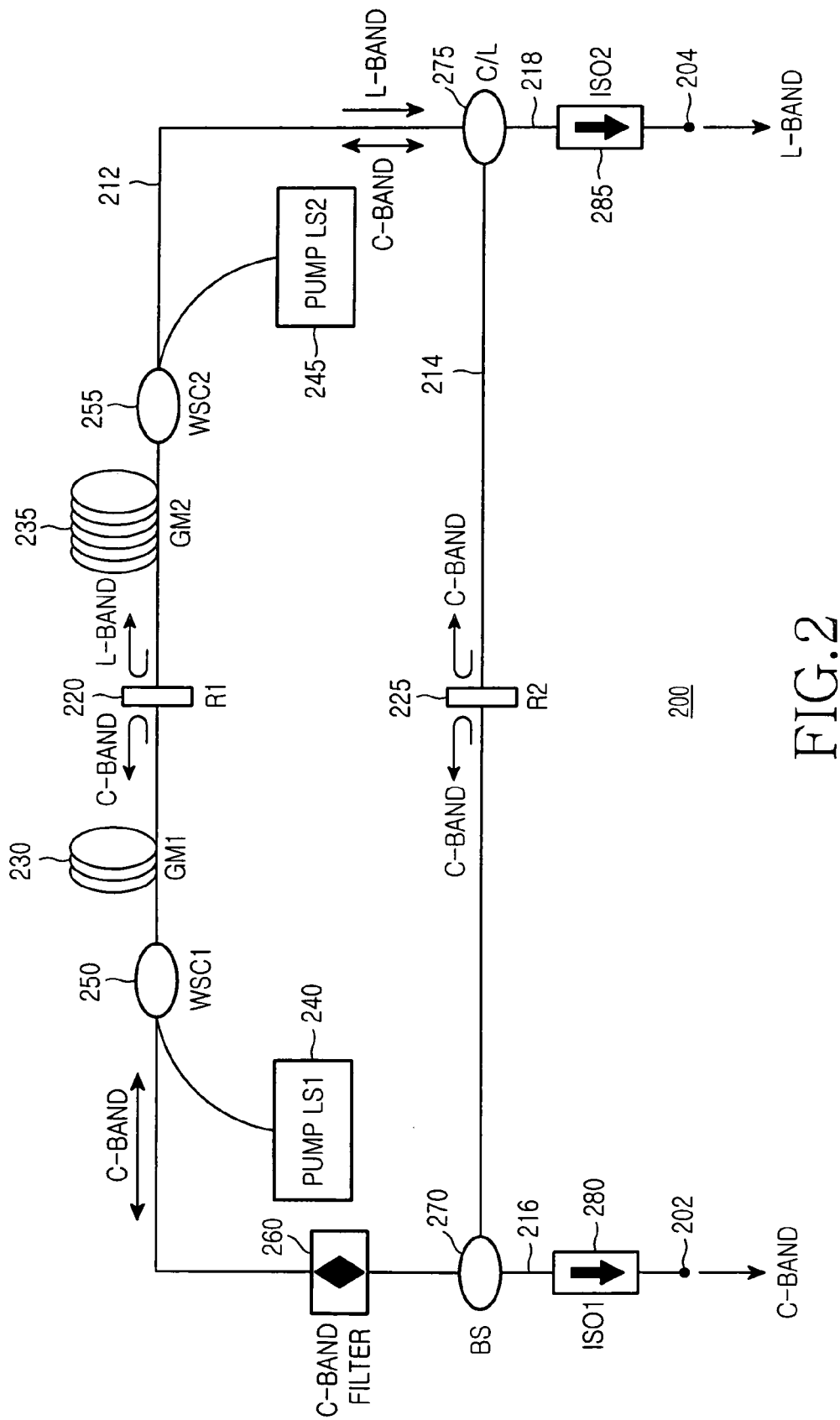
FIG. 2 illustrates the configuration of a dual-port broadband light source according to another embodiment of the present invention.

FIG. 2 illustrates the configuration of a dual-port broadband light source according to another embodiment of the present invention. As shown, broadband light source 200 comprises first to fourth light paths 212, 214, 216 and 218, first and second gain media 230 and 235 (GM1 and GM2), first and second WSCs 250 and 255 (WSC1 and WSC2), first and second pump light sources 240 and 245 (pump LS1 and pump LS2), first and second reflectors 220 and 225 (R1 and R2), a C-band filter 260, a beam splitter 270 (BS), a C/L coupler 275 (C/L), and first and second isolators 280 and 285 (ISO1 and ISO2). The broadband light source 200 is identical to the broadband light source 100, referred to in FIG. 1, except that the L-band filter 165 is omitted, the second WSC 225 is placed at a different position, and the second beam splitter 175 is replaced by the C/L coupler 275. Therefore, the broadband light source 200 will be described with regard to these differences to avoid redundant description.

The first pump light source 240 emits a first pumping light. The first WSC 250 is installed in the first light path 212 and provides the first pumping light to the first gain medium 230. The first gain medium 230 is installed in the first light path 212. As the first gain medium 230 is pumped by the first pumping light, it emits a C-band ASE light through both ends thereof and amplifies C-band ASE light reflected by reflector 220. The second pump light source 245 emits a second pumping light. The second WSC 255 is installed in the first light path 212 and provides the second pumping light to the second gain medium 235. The second gain medium 235 is installed in the first light path 212. As the second gain medium 235 is pumped by the second pumping light, it emits a C-band ASE light and an L-band ASE light and outputs the L-band ASE light through both ends thereof, while outputting the C-band ASE light to the second WSE 255. The first reflector 220 is disposed between the first and second gain media 230 and 235 in the first light path 212 and reflects the input ASE light. In this case, the C-band ASE light reflected by the first reflector 220 is amplified in the first gain medium 230 and the L-band ASE light reflected by the first reflector 220 is amplified in the second gain medium 235. The C-band filter 260 is disposed between the first WSC 250 and the beam splitter 270 in the first light path 212. The C-band filter 260 restricts the wavelength band of an input C-band ASE light to a predetermined first wavelength band within the C-band (filtering), thereby concentrating energy in the first wavelength band and thus achieving high output power. The beam splitter 270 connects the first light path 212 to the second and third light paths 214 and 216. The beam splitter 270 splits the filtered C-band ASE into a first and a second filtered C-band ASEs at a predetermined first ratio and outputs the second filtered C-band ASE to the second light path 214 and the first filtered C-band ASE light to the third light path 216. The beam splitter 270 outputs the second filtered C-band ASE light fed back from the second light path 214 to the first light path 212 and the second filtered C-band ASE light is provided to first gain medium 230 through the C-band filter 260 and the first WSC 250. The first isolator 280 is positioned in the third light path 216. It passes the input first filtered C-band ASE light and blocks a backward or reflected light. The first filtered C-band ASE is output through a first output port 202 of the broadband light source 200.

The C/L coupler 275 connects the first light path 212 to the second and fourth light paths 214 and 218. The C/L coupler 275 outputs the input L-band ASE light to the fourth light path 218, the input C-band ASE light to the second light path 214, and the C-band ASE light received from the second light path 214 to the first light path 212. The reflected C-band ASE light output to the first light path 212 is provided to second gain medium 235 through the second WSC 255, thereby functioning as an auxiliary pumping light for pumping the second gain medium 235 along with the second pumping light.

The second isolator 285, positioned in the fourth light path 218, passes the input L-band ASE light and blocks a backward light. The decoupled L-band ASE light is output through a second output port 204 of the broadband light source 200

Figure 3:
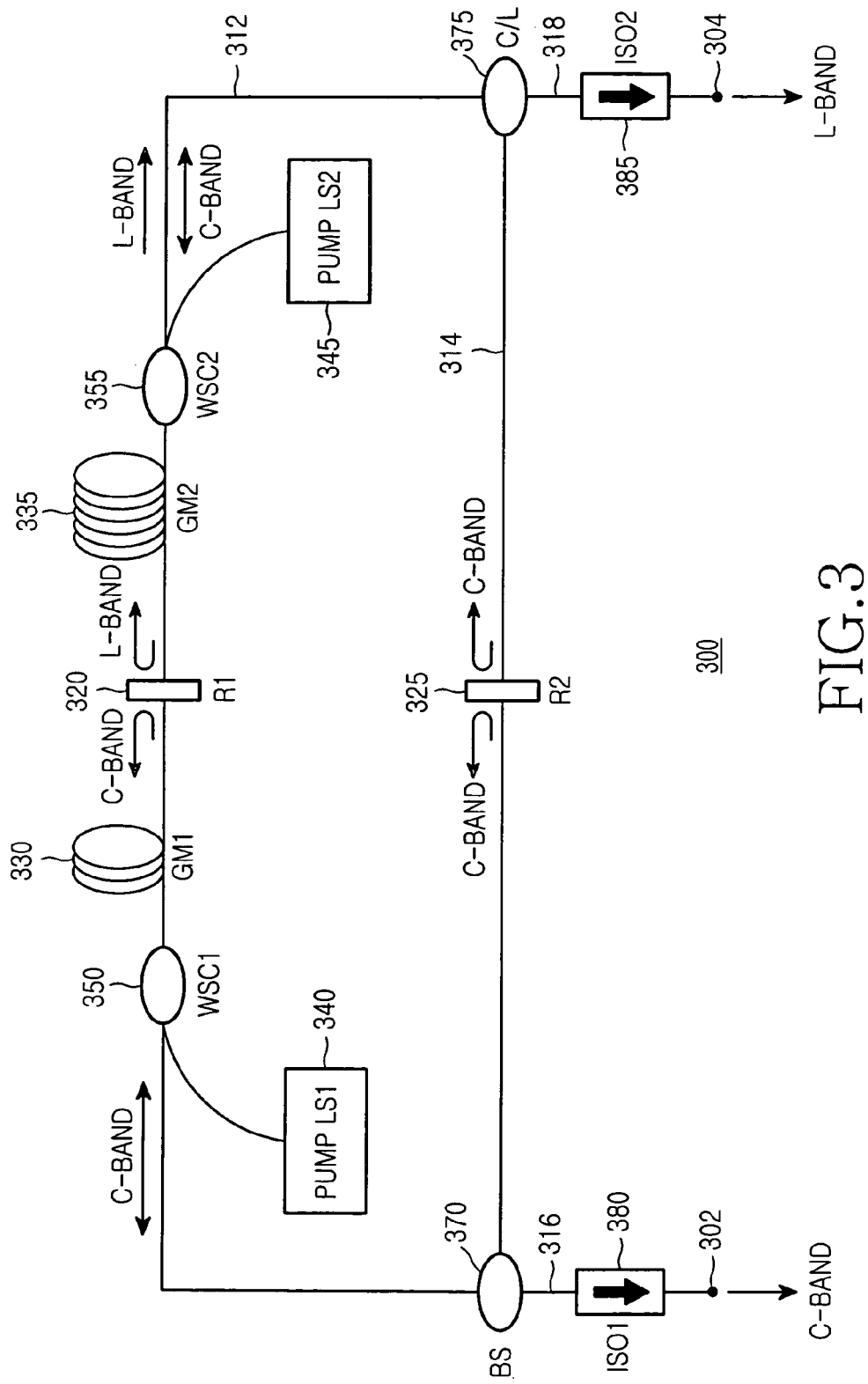
FIG. 3 illustrates the configuration of a dual-port broadband light source according to a third embodiment of the present invention.

FIG. 3 illustrates the configuration of a dual-port broadband light source according to a third embodiment of the present invention. As shown, a broadband light source 300 comprises first to fourth light paths 312, 314, 316 and 318, first and second gain media 330 and 335 (GM1 and GM2), first and second WSCs 350 and 355 (WSC1 and WSC2), first and second pump light sources 340 and 345 (pump LS1 and pump LS2), first and second reflectors 320 and 325 (R1 and R2), a beam splitter 370 (BS), a C/L coupler 375 (C/L), first and second isolators 380 and 385 (ISO1 and ISO2), and first and second output ports 302 and 304. The broadband light source 300 is identical to the broadband light source 200, shown in FIG. 2, except that the C-band filter 260 is omitted. Therefore, a detailed description of the broadband light source 300 need not be provided as its operation is similar to that described with regard to FIG. 2.

Figure 4:
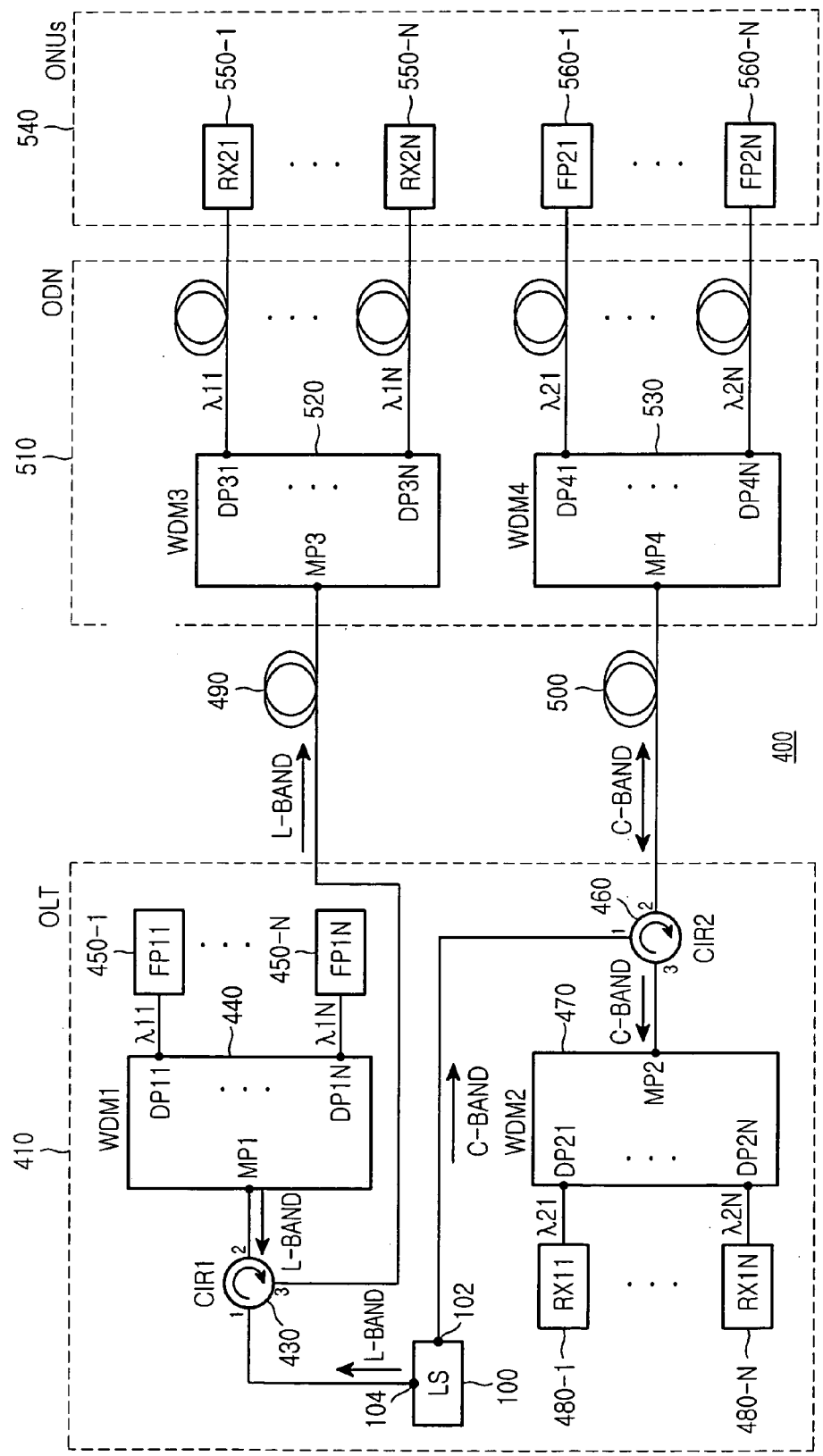
FIG. 4 illustrates the configuration of a WDM-PON using the broadband light source illustrated in FIG. 1.

FIG. 4 illustrates the configuration of a WDM-PON using the broadband light source illustrated in FIG. 1. As shown, a WDM-PON 400 comprises an optical line termination (OLT) 410 connected to first and second optical fibers 490 and 500, an optical distribution network (ODN) 510, and optical network units (ONUs) 540.

OLT 410 includes the broadband light source 100, first and second circulators 430 and 460 (CIR1 and CIR2), first and second wavelength division multiplexers 440 and 470 (WDM1 and WDM2), $11^{th}$ to $1N^{th}$ Fabry-Perot lasers 450-1 to 450-N (FP11 to FP1N), and $11^{th}$ to $1N^{th}$ optical receivers 480-1 to 480-N (RX11 to RX1N).

The broadband light source 100 outputs a C-band ASE light through a first output port 102 and an L-band ASE light through a second output port 104, as previously described.

First circulator 430 includes first, second and third ports 430-1, 430-2, 430-3. First port 430-1 is connected to the second output port 104 of the broadband light source 100, second port 430-2 is connected to a first multiplexing port (MP1) of the first WDM 440, and third port 430-3 is connected to the first optical fiber 490. The first circulator 430 outputs the L-band ASE light received at the first port 430-1 to the second port 430-2 and an L-band optical signal received at the second port 430-2 to the third port 430-3.

The first WDM 440 includes first multi-port (MP1) and $11^{th}$ to $1N^{th}$ demultiplexing ports (DP11 to DP1N). The $11^{th}$ to $1N^{th}$ DPs are connected to the $11^{th}$ to $1N^{th}$ Fabry-Perot lasers 450-1 to 450-N in a one-to-one correspondence. The first WDM 440 demultiplexes an L-band ASE light received at MP1 into $11^{th}$ to $1N^{th}$ channels at different wavelengths (i.e., $\lambda$-11 to $\lambda$-1N) and outputs them through the $11^{th}$ to $1N^{th}$ DPs. The $11^{th}$ to $1N^{th}$ Fabry-Perot lasers 450-1 to 450-N output amplified channels are locked to the wavelengths of their corresponding channels. The first WDM 440 generates the L-band optical signal by multiplexing the signals($\lambda$-11 to $\lambda$-1N) on channels $11^{th}$ to $1N^{th}$ received at the $11^{th}$ to $1N^{th}$ DPs and outputs the L-band optical signal through the port MP1.

Second circulator 460 has first, second and third ports 460-1, 460-2 and 460-3. The first port 460-1 is connected to the first output port 102 of the broadband light source 100, second port 460-2 is connected to the second optical fiber 500, and third port 460-3 to a second multi-port MP2 of the second WDM 470. The second circulator 460 outputs the C-band ASE light received at the first port 460-1 to the second port 460-2 and a C-band optical signal received at the second port 460-2 to the third port 460-3.

The second WDM 460 includes second port MP2 and $21^{st}$ to $2N^{th}$ DPs (DP21 to DP2N). The 21st to $2N^{th}$ DPs are connected to the $11^{th}$ to $1N^{th}$ optical receivers 480-1 to 480-N in a one-to-one correspondence. The second WDM 460 demultiplexes a C-band ASE light received at the second port MP2 into $21^{st}$ to $2N^{th}$ channels at different wavelengths, i.e., $\lambda$-21 to $\lambda$-2N, and outputs them through the 21st to $2N^{th}$ DPs. The $11^{th}$ to $1N^{th}$ optical receivers 480-1 to 480-N detect the signal on corresponding channels.

ODN 510 includes third and fourth WDMs 520 and 530 (WDM3 and WDM4). The ONUs 540 further include $21^{st}$ to $2N^{th}$ optical receivers 550-1 to 550-N and $21^{st}$ to $2N^{th}$ Fabry-Perot lasers 560-1 to 560-N.

Third WDM 520 includes a third multi-port (MP3) and $31^{st}$ to $31N^{th}$ DPs (DP31 and DP3N). Third MP (MP3) is connected to the first optical fiber 490 and the $31^{st}$ to $31N^{th}$ DPs are connected to the $21^{st}$ to $21N^{th}$ optical receivers 550-1 to 550-N in a one-to-one correspondence. The third WDM 520 demultiplexes an L-band optical signal, containing wavelengths $\lambda$-11 to $\lambda$-1N received at the third port MP3 into the $11^{th}$ to $1N^{th}$ channels at different wavelengths and outputs them through the $31^{st}$ to $3N^{th}$ DPs. The $11^{th}$ to $1N^{th}$ optical receivers 550-1 to 550-N detect the wavelengths received on their corresponding channels.

Fourth WDM 530 includes a fourth multi-port (MP4) and $41^{st}$ to $4N^{th}$ DPs. The fourth port (MP4) is connected to the second optical fiber 500 and the $41^{st}$ to $4N^{th}$ DPs are connected to the $21^{st}$ to $2N^{th}$ Fabry-Perot lasers 560-1 to 560-N in a one-to-one correspondence. The fourth WDM 530 demultiplexes a C-band ASE light signal, containing wavelengths $\lambda$-21 to $\lambda$-2N, received at the fourth MP into $21^{st}$ to $2N^{th}$ channels and outputs the respective wavelengths through the $41^{st}$ to $4N^{th}$ DPs. The $21^{st}$ to $2N^{th}$ Fabry-Perot lasers 560-1 to 560-N output amplified channels are locked to the wavelengths of their corresponding channels. The fourth WDM 530 generates a C-band optical signal by multiplexing the wavelengths $\lambda$-11 to $\lambda$-1N on $21^{st}$ to $2N^{th}$ channels received at the $41^{st}$ to $4N^{th}$ DPs and outputs the C-band optical signal through the fourth MP (MP4).

As described above, the dual-port broadband light source of the present invention advantageously enables independent output control of first and second ASE light generated from first and second gain media. The use of first and second reflectors increases the output power and output efficiency of the broadband light source and allows the broadband light source to function as two light sources in different wavelength bands.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A dual-port broadband light source comprising:
   a first gain medium for generating a first amplified spontaneous emission (ASE);
   a second gain medium for generating a second ASE;
   a first beam splitter connecting a first light path to a second and a third light path, for splitting the first ASE at a first ratio and, outputting the split first ASEs to the second and third light paths, and further outputting the first ASE received from the second light path to the first light path;
   a second beam splitter connecting the first light path to the second light path and a fourth light path, for splitting the second ASE at a second ratio, outputting the split second ASEs to the second and fourth light sources, and outputting the second ASE received from the second light path to the first light path;
   a first reflector positioned in the first light path, for reflecting input first and second ASEs;
   a second reflector positioned in the second light path, for reflecting input first and second ASEs, wherein the
   first gain medium is positioned between the first reflector and the first beam splitter in the first light path and the second gain medium is positioned between the first reflector and the second beam splitter in the first light path.

2. The dual-port broadband light source of claim 1, wherein the first ASE is C-band ASE and the second ASE is L-band ASE.

3. The dual-port broadband light source of claim 1, further comprising:
   a first pump light source for outputting a first pumping light; and
   a first wavelength selective coupler (WSC) positioned in the first light path, for providing the first pumping light to the first gain medium.

4. The dual-port broadband light source of claim 1, further comprising:
   a second pump light source for outputting a second pumping light; and
   a second WSC positioned between the first reflector and the second gain medium in the first light path, for providing the second pumping light to the second gain medium.

5. The dual-port broadband light source of claim 1, further comprising:
   a first filter positioned between the first gain medium and the first beam splitter in the first light path, for restricting the input first ASE to a first wavelength band.

6. The dual-port broadband light source of claim 1, further comprising:
   a second filter positioned between the second gain medium and the second beam splitter in the first light path, for restricting the input second ASE to a second wavelength band.

7. The dual-port broadband light source of claim 1, further comprising;
   a first isolator positioned in the third light path, for passing the input first ASE and blocking backward light.

8. The dual-port broadband light source of claim 1, further comprising:
   a second isolator positioned in the fourth light path, for passing the input second ASE and blocking backward light.

9. A dual-port broadband light source comprising:
   a beam splitter connecting a first light path to second and third light paths, for splitting a first amplified spontaneous emission (ASE) at a first ratio, to the second and third light paths;
   a coupler connecting the first light path to the second light path and a fourth light path, for outputting a third ASE received from the first light path to the second light path, and a second ASE received from the first light path to the fourth light path;
   a first reflector positioned in the first light path, for reflecting the input first and second ASEs;
   a second reflector positioned in the second light path, for reflecting the input first and third ASEs;

a first gain medium positioned between the first reflector and the beam splitter in the first light path, for generating the first ASE; and a second gain medium positioned between the first reflector and the coupler in the first light path, for generating the second and third ASEs.

10. The dual-port broadband light source of claim 9, wherein the first and third ASEs are C-band ASE and the second ASE is L-band ASE.

11. The dual-port broadband light source of claim 9, further comprising:

a first pump light source for outputting a first pumping light; and a first wavelength selective coupler (WSC) positioned in the first light path, for providing the first pumping light to the first gain medium.

12. The dual-port broadband light source of claim 9, further comprising:

a second pump light source for outputting a second pumping light; and a second WSC positioned between the second gain medium and the coupler in the first light path, for providing the second pumping light to the second gain medium.

13. The dual-port broadband light source of claim 9, further comprising:

a filter positioned between the first gain medium and the beam splitter in the first light path, for restricting the input first ASE to a predetermined wavelength band by filtering.

14. The dual-port broadband light source of claim 9, further comprising:

a first isolator positioned in the third light path, for passing the input first ASE and blocking backward light.

15. The dual-port broadband light source of claim 9, further comprising a second isolator positioned in the fourth light path, for passing the input second ASE and blocking backward light.

16. A dual-port broadband light source comprising:

a first gain medium for generating a first amplified spontaneous emission (ASE);

a second gain medium for generating at least one second ASE;

a first beam splitter connecting a first light path to a second and a third light path, for splitting and, outputting the first ASE to the second and third light paths;

a second beam splitter connecting the first light path to the second light path and a fourth light path, for splitting and outputting the at least one second ASE to the second and fourth light paths;

a first reflector positioned in the first light path for reflecting ASE provided thereto;

a second reflector positioned in the second light path, for reflecting ASE provided thereto, wherein the first gain medium is positioned between the first reflector and the first beam splitter in the first light path and the second gain medium is positioned between the first reflector and the second beam splitter in the first light path.

17. The dual-port broadband light source of claim 16, wherein the first ASE is C-band ASE and the at least one second ASE is selected from the group consisting of: C-band and L-band ASE.

18. The dual-port broadband light source of claim 16, further comprising:

a first pump light source for outputting a first pumping light; and a first wavelength selective coupler (WSC) positioned in the first light path, for providing the first pumping light to the first gain medium.

19. The dual-port broadband light source of claim 16, further comprising:

a second pump light source for outputting a second pumping light; and a second WSC positioned between the first reflector and the second gain medium in the first light path, for providing the second pumping light to the second gain medium.

20. The dual-port broadband light source of claim 16, further comprising:

a first filter having a known bandwidth positioned between the first gain medium and the first beam splitter in the first light path, for limiting the first ASE to said known bandwidth.

21. The dual-port broadband light source of claim 16, further comprising:

a second filter having a known bandwidth positioned between the second gain medium and the second beam splitter in the first light path, for limiting the second ASE to said known bandwidth.

22. The dual-port broadband light source of claim 16, further comprising;

a first isolator positioned in the third light path, for passing the input first ASE and blocking backward light.

23. The dual-port broadband light source of claim 16, further comprising:

a second isolator positioned in the fourth light path, for passing the input second ASE and blocking backward light.

* * * * *